United States Patent [19]
Johnson

[11] Patent Number: 5,819,046
[45] Date of Patent: Oct. 6, 1998

[54] SYSTEM FOR INVOKING IN COMPUTER APPLICATION ASSOCIATED WITH SECOND USER CONNECTED TO THE COMPUTER AND SUBJECT TO ANY ACTIVE CONDITIONS ASSOCIATED WITH THE SECOND USER

[75] Inventor: William J. Johnson, Flower Mound, Tex.

[73] Assignee: MCI Communications Corporation, Washington, D.C.

[21] Appl. No.: 646,907

[22] Filed: May 8, 1996

[51] Int. Cl.$^6$ ........................................... G06F 13/00
[52] U.S. Cl. ........................................ 395/200.57; 379/201
[58] Field of Search ........................ 379/96–97, 201, 379/67, 88, 210, 212, 266, 100, 112, 202, 216, 59, 92, 89, 207, 230, 259, 211, 219, 269, 94, 16, 198, 265, 268; 395/200.57, 200.58, 200.61

[56] References Cited

U.S. PATENT DOCUMENTS

| | | | |
|---|---|---|---|
| 4,805,209 | 2/1989 | Baker, Jr. et al. | 379/96 |
| 4,930,150 | 5/1990 | Katz | 379/93 |
| 5,168,519 | 12/1992 | Scarinci et al. | 380/6 |
| 5,299,260 | 3/1994 | Shaio | 379/265 |
| 5,351,285 | 9/1994 | Katz | 379/94 |
| 5,471,522 | 11/1995 | Sells et al. | 379/97 |
| 5,557,668 | 9/1996 | Brady | 379/212 |
| 5,642,410 | 6/1997 | Walsh et al. | 379/201 |

*Primary Examiner*—Moustafa M. Meky

[57] ABSTRACT

Communication activated processing is described herein. A connection is established between a first user at a computer and a second user. For example, establishment of this connection may involve the computer initiating an outbound telephone call to the second user, or the computer receiving an inbound telephone call from the second user. The computer determines whether the second user is configured in a condition table. If the second user is configured in the condition table, then an application associated with the second user is automatically, and optionally, invoked in the computer subject to any active conditions associated with the second user. That is, the application associated with the second user may be automatically invoked only if any active conditions associated with the second user are satisfied.

25 Claims, 13 Drawing Sheets

FIG. 3

CONDITION TABLE 202

| DIRECTION | PHONE NUMBER PREDICATE | APPLICATION IDENTIFIER | CONDITION 1 | CONDITION 2 | . . . | CONDITION N |
|---|---|---|---|---|---|---|
|  |  |  |  |  | . . . |  |

FIG. 4

CONDITION TABLE 202

| | DIRECTION | PHONE NUMBER PREDICATE | APPLICATION IDENTIFIER | UCM FLAG | PMF FLAG | UHPM FLAG | CHPM FLAG |
|---|---|---|---|---|---|---|---|
| 402 | INBOUND | 202-371* | CONTACTS.EXE | NO | NO | NO | NO |
| 404 | INBOUND | 703-729-1111 | BUDGET.BAT | YES | YES | NO | NO |
| 406 | OUTBOUND | 703-512-1000 | STATUS.FCN | NO | NO | YES | YES |
| 408 | BOTH | 212-333-1111 | CALENDAR.EXE | NO | NO | NO | NO |

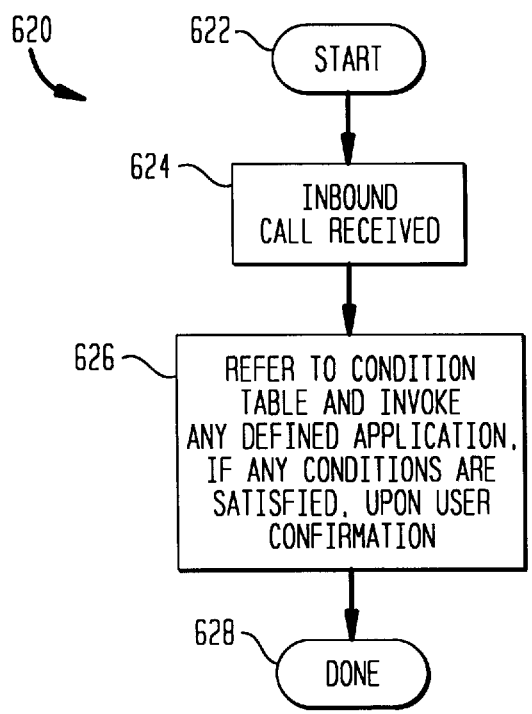

SYSTEM FOR INVOKING IN COMPUTER APPLICATION ASSOCIATED WITH SECOND USER CONNECTED TO THE COMPUTER AND SUBJECT TO ANY ACTIVE CONDITIONS ASSOCIATED WITH THE SECOND USER

BACKGROUND OF THE INVENTION

1. Field of the Invention

The present invention relates generally to telecommunications, and more particularly to communication activated invocation of computer applications.

2. Related Art

A person often associates particular tasks with particular people. For example, a person may associate the task of updating the status of his investment portfolio with his financial planner. As a routine matter, the person updates his investment portfolio whenever he speaks with his financial planner. As another example, a person may associate the task of updating his vacation planning calendar with his travel agent. As a routine matter, the person updates his vacation planning calendar whenever he speaks with his travel agent.

Also, a person often associates particular tasks with particular situations that are in progress. For example, suppose that Person A needs information from Person B in order to prepare the annual company budget. For this situation, Person A associates with Person B the task of preparing the annual budget. When they next speak, Person A obtains from Person B the information needed to prepare the annual company budget.

Often, interaction between people occurs via telephone. For example, the interactions described above often occurs by telephone.

Many tasks are performed using computers. For example, the tasks mentioned above are often performed using a computer running a financial application, a calendar application, and a spread sheet application. Conventionally, however, a person must manually invoke such computer applications. For example, if a person's travel agent calls, then the person must manually invoke his calendar application so as to update his vacation planning calendar.

Such manual invocation of computer applications is sometimes a difficult matter. First, the person must recall which application is the appropriate one to invoke. This may not be an easy task, particularly if the person has a bad memory, or if the person has many different applications for performing the same function (such as multiple word processing applications). Second, the person must find the application in his computer. This second task may not be easy to perform if the person's computer stores a great many applications, or if the computer's storage medium is not well organized. Third, the person must invoke the application.

It would be desirable for a user's computer to automatically invoke a computer application for performing a task when contact is made via telephone with the person associated with the task, or when contact is made via telephone with the person involved in a situation associated with the task.

SUMMARY OF THE INVENTION

Briefly stated, the present invention is directed to a system and method for communication activated processing. According to the present invention, a connection is established between a first user at a computer and a second user. Establishment of this connection may involve the computer initiating an outbound telephone call to the second user, or the computer receiving an inbound telephone call from the second user. The computer determines whether the second user is configured in a condition table. If the second user is configured in the condition table, then an application associated with the second user is invoked in the computer subject to any active conditions associated with the second user, and subject to receiving invocation confirmation from the first user. That is, the application associated with the second user is invoked only if any active conditions associated with the second user are satisfied, and (optionally) only if the first user confirms the invocation.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE FIGURES

The present invention will be described with reference to the accompanying drawings, wherein:

FIG. 3 illustrates the format of a condition table;

FIG. 4 illustrates an example condition table;

FIGS. 5, 6A, 6B, 7, 8, 9, 10, 11, 12, and 13 are flowcharts representing the operation of the invention;

DETAILED DESCRIPTION OF THE PREFERRED EMBODIMENTS

The present invention is directed to a system and method for telephone activated processing upon the occurrence of pre-defined (or configured) events. More particularly, the present invention is directed to a system and method for automatically invoking a computer application for performing a task when contact is made with a person associated with the task, or when contact is made with a person involved in a situation associated with the task.

Figure 1:
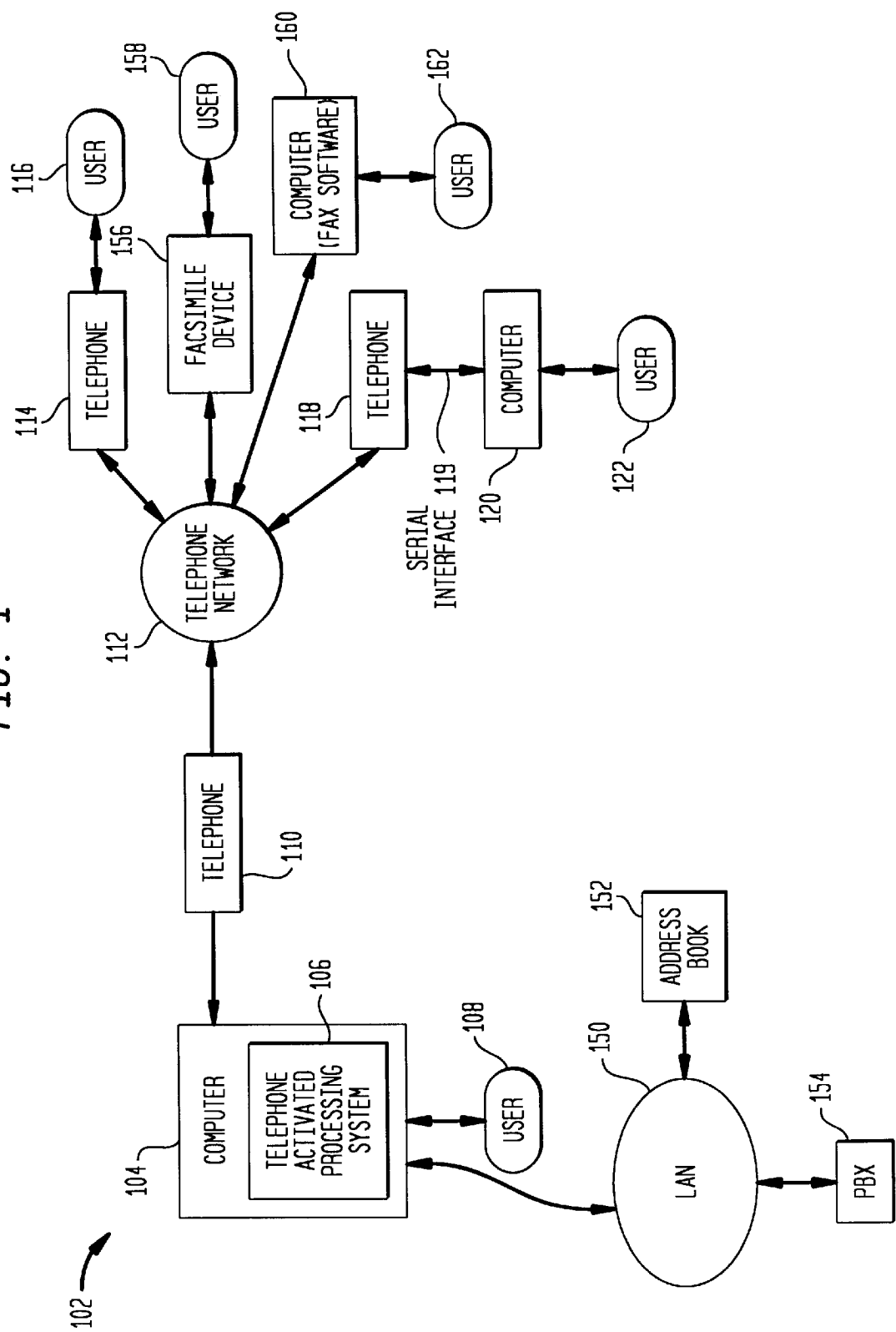
FIG. 1 is a block diagram of a data processing environment according to a preferred embodiment of the invention.

FIG. 1 is a block diagram of a data processing environment 102 according to a preferred embodiment of the present invention. A user 108 (also called a party) interacts with a computer 104 (or other data processing device) that is connected to a communication network, such as telephone network 112, via a communication device, such as telephone 110. Other users are connected to the telephone network 112 via telephones and computers. For example, user 116 is connected to the telephone network 112 via a telephone 114. User 122 is connected to the telephone network 112 via a computer 120 and telephone 118.

The present invention envisions other forms of communication. For example, a user 158 may communicate with others via a facsimile device 156. Another user 162 may communicate with others via a computer 160 that runs fax software or other types of communication software, such as communication network software.

The computer 104 includes a communication activated processing system (CAPS) 106. According to the present invention, the CAPS 106 automatically invokes, in the computer 104, a computer application for performing a task when contact is made with a person (such as users 116, 122, 158, 162) associated with the task, or when contact is made with a person (such as users 116, 122, 158, 162) involved in a situation associated with the task. For example, suppose that user 116 is user 108's travel agent. Assume that the user 108 routinely updates his vacation planning calendar whenever he speaks with his travel agent, i.e., user 116. According to the present invention, whenever contact is made between user 108 and 116, the CAPS 106 automatically invokes a calendar program in the computer 104 for the purpose of enabling the user 108 to update his vacation planning calendar. This is the case, whether user 108 calls user 116, or vice versa.

Preferably, the CAPS 106 obtains user approval before automatically invoking applications. In other words, the user may override the automatic invocation of an application by the CAPS 106. The user may wish to override automatic application invocation in order to prevent multiple invocations of the same application, to prevent an undesired application from being invoked, etc. Preferably, the CAPS 106 provides a user interface to enable the user to override automatic invocation of an application. The user interface is preferably a pop-up window identifying criteria and other information (such as whether an instance of the application is already invoked) about the call and applicable conditions. The user can review such criteria and information presented in the pop-up window to determine whether he wishes to allow the CAPS 106 to automatically invoke the application.

The computer applications mentioned herein may be compiled files (typically having file names with a "EXE" or "CMD" extension), batch files (typically having file names with a "BAT" extension), or any other type of well known executable files. The computer applications also include macro files, which according to the invention are file names having a "FCN" extension. Such macro files are discussed in greater detail below.

For illustrative purposes, the present invention is described herein in the context of a telecommunication environment as shown in FIG. 1. However, the invention is not limited to this embodiment. Instead, the invention is applicable to all environments where users communicate with each other using any communication means, devices, systems, services, methods, procedures, etc.

For example, in addition to the telecommunication environment shown in FIG. 1, the invention is also applicable to an environment wherein users communicate with each other via "chat lines" provided by computer networking services, such as PRODIGY or AMERICA ON-LINE, or via the Internet. In such environments, computers (such as computers 104, 120) are connected to one another via computer networks. (As used herein, the term computer network includes any mechanism, medium, and/or procedure for connecting computers to one another.)

The CAPS 106 of the present invention automatically invokes, in the computer 104, appropriate computer applications when connections via computer networks are established between the computer 104 and other computers, such as computer 120, irrespective of the computer which initiated such connection. The computers include well known communication devices, modules, procedures, services, applications, etc., to establish connections between themselves. Communication between computers 104 and 120 (for example) may be in real time (such as an interactive cyberspace conversation), or may be displaced in time (such as an exchange of e-mail). In this latter embodiment, for example, an appropriate computer application is automatically invoked in the computer 104 when an email is sent from user 122 to user 108, or from user 108 to user 122, via computers 104, 120.

Therefore, various embodiments will utilize various communications forms, and addresses associated therewith, for the purpose of automatically invoking applications associated with communications of any type to or from certain remote addresses.

Figure 14:
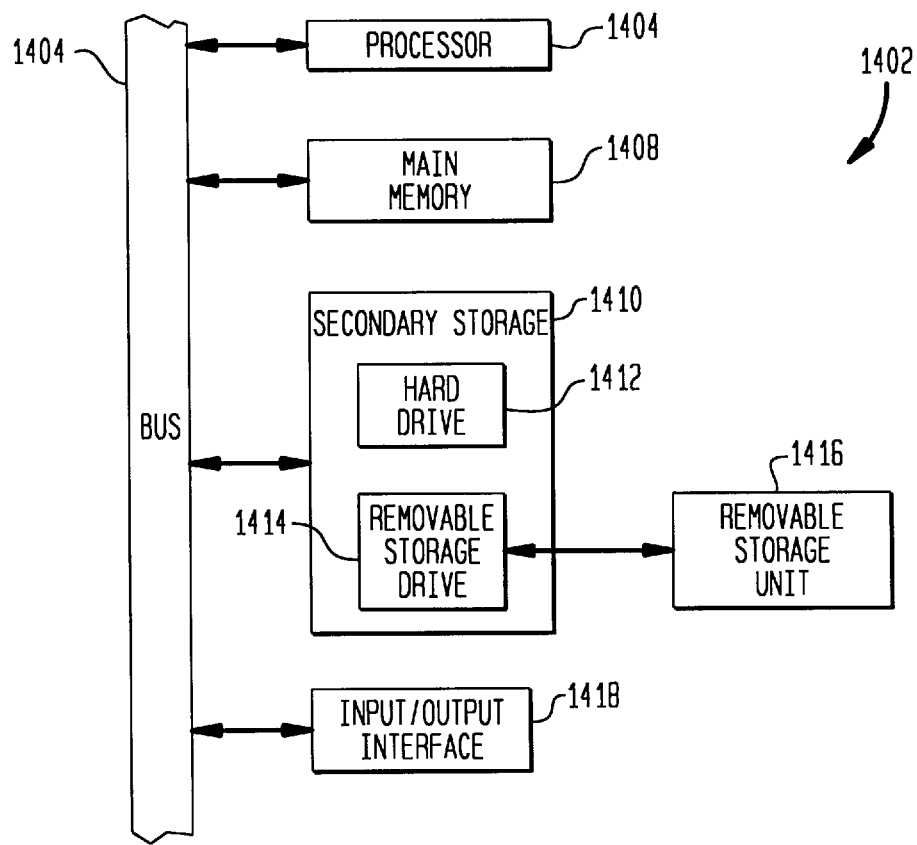
FIG. 14 is a block diagram of a computer useful for implementing components of the invention.

Computers 104 and 120 are preferably each implemented using a computer such as computer 1402 shown in FIG. 14. The computer 1402 includes one or more processors, such as processor 1404. The processor 1404 is connected to a communication bus 1406.

The computer 1402 also includes a main memory 1408, preferably random access memory (RAM), and secondary storage 1410. The secondary storage 1410 includes, for example, a hard disk drive 1412 and/or a removable storage drive 1414, representing a floppy disk drive, a magnetic tape drive, a compact disk drive, etc. The removable storage drive 1414 reads from and/or writes to a removable storage unit 1416 in a well known manner.

Removable storage unit 1416, also called a program storage device or a computer program product, represents a floppy disk, magnetic tape, compact disk, etc. As will be appreciated, the removable storage unit 1416 includes a computer usable storage medium having stored therein computer software and/or data.

Computer programs (also called computer control logic) are stored in main memory 1408 and/or the secondary storage 1410. Such computer programs, when executed, enable the computer 1402 to perform the features of the present invention as discussed herein. In particular, the computer programs, when executed, enable the processor 1404 to perform the features of the present invention. Accordingly, such computer programs represent controllers of the computer 1402.

Preferably, the CAPS 106 represents a computer program residing in main memory 1408 and/or secondary storage 1410, and executing in the computer 1402.

In one embodiment, the invention is directed to a computer program product comprising a computer readable medium having control logic (computer software) stored therein. The control logic, when executed by the processor 1404, causes the processor 1404 to perform the functions of the invention as described herein.

In another embodiment, the invention is implemented primarily in hardware using, for example, a state machine (or multiple state machines). Implementation of the hardware state machine so as to perform the functions described herein will be apparent to persons skilled in the relevant art(s).

Preferably, the computer 1402 is a computer capable of interfacing with a telephone network, and capable of performing telephone related functions, such as receiving telephone calls, initiating telephone calls, determining the identity (ANI) of a telephone caller, storing messages from telephone callers (voice mail), etc. The computer 1402 is also capable of accessing other users' email and phone mail (at least when such users are connected to the computer 1402 over a network). A computer suitable for use by the present invention is a computer connected to a ROLM 244 PC through a serial interface, although the invention is not limited to this implementation.

Communication Activated Processing System

Figure 2:
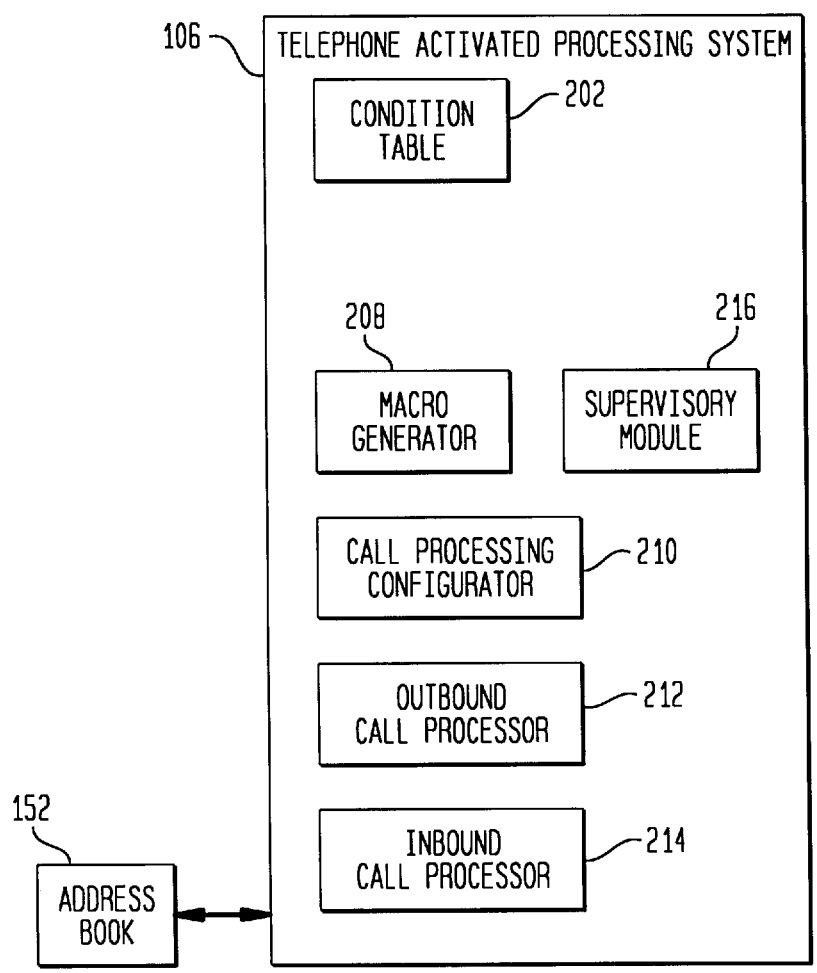
FIG. 2 is a block diagram of a communication activated processing system according to a preferred embodiment of the invention.

The communication activated processing system (CAPS) 106 of the present invention is shown in block diagram form in FIG. 2. The CAPS 106 includes a condition table 202 for configuring inbound and/or outbound conditions.

With regard to inbound calls, the condition table 202 associates telephone callers (i.e., a party who initiates a telephone call) with computer applications and conditions. If the computer 104 receives an inbound telephone call from a telephone caller represented in the condition table 202, then the CAPS 106 invokes a computer application (upon receipt of user confirmation) associated with the inbound telephone caller if the conditions (if any) associated with the inbound telephone caller are satisfied.

With regard to outbound calls, the condition table 202 associates telephone callees (i.e., a party who receives a telephone call) with computer applications and conditions. If the computer 104 initiates an outbound telephone call to a telephone callee represented in the condition table 202, then the CAPS 106 invokes a computer application (upon receipt of user confirmation) associated with the telephone callee if the conditions (if any) associated with the telephone callee are satisfied.

FIG. 3 illustrates the format of the condition table 202. Each row of the condition table 202 includes a direction field (that indicates whether the row applies to inbound calls, outbound calls, or both inbound and outbound calls), a phone number predicate field, an application identifier field, and a plurality of condition fields. The condition table 202 will now be described in greater detail with reference to an example condition table 202 shown in FIG. 4.

Rows 402, 404, and 408 of the condition table 202 represent configurations for inbound calls, since the direction field is equal to either "Inbound" or "Both." Each of these rows includes a phone number predicate field. The phone number predicate field identifies a party whose calls (initiated by the party to the computer 104) are being screened. The telephone number predicate field includes information identifying a telephone number (such as in row 404) or a range of telephone numbers (such as in row 402). Wildcard symbols such as "*" are used in a well known manner to specify a range of telephone numbers.

Each row also includes an application identifier field. The application identifier field stores a file name that identifies a computer file (i.e., files having a EXE, CMD, BAT, FCN, etc., extension, for example).

Each row further includes a list of condition flags. The example condition flags shown in FIG. 4 are the UCM (unanswered COD mail) flag, the PMF (phone mail full) flag, the UHPM (user has phone mail) flag, and CHPM (caller has phone mail) flag. These condition flags indicate whether the condition is active (a condition is active if its corresponding flag is TRUE). If no conditions are active, then only the match of the phone number is enough to satisfy a hit in the condition table 202. The UCM, PMF, UHPM, and CHPM conditions are discussed in greater detail below. It should be understood, however, that these conditions are discussed herein for illustrative purposes only. The scope of the invention includes other conditions. The conditions used for any given application is implementation and/or application specific.

If the computer 104 receives a telephone call from a party, and that party is identified in the phone number predicate field of an inbound row (i.e., a row where the direction field is equal to "Inbound" or "Both") in the condition table 202, then the CAPS 106, after receiving confirmation from the user, invokes the computer application identified by the application identifier field of the row if any active conditions (as indicated by the condition flags of the row) are satisfied.

The condition table 202 of FIG. 4 includes two outbound rows 406, 408. These outbound rows 406, 408 are those where the direction field is equal to "Outbound" or "Both." Note that row 408 is both an inbound row and an outbound row. Outbound rows 406, 408 associate telephone callees (i.e., a party who receives a telephone call) with computer applications and conditions. If the computer 104 initiates an outbound telephone call to a telephone callee represented in an outbound row of the condition table 202, then the CAPS 106, upon receiving user confirmation, invokes a computer application associated with the telephone callee if the conditions (if any) associated with the telephone callee are satisfied. Specifically, if the computer 104 initiates an outbound telephone call to a party, and that party is identified in the phone number predicate field of an outbound row in the condition table 202, then the CAPS 106, after receiving user confirmation, invokes the computer application identified by the application identifier field of the outbound row if any active conditions (as indicated by the condition of the row) are satisfied.

In other embodiments, the condition table 202 is implemented as two tables, an inbound table and an outbound table.

Referring again to FIG. 2, the address book 152 stores information pertaining to users on a communication network on which the computer 104 is connected, such as name, physical address, voice telephone number, voice mail identifier, data telephone number, email identifier, etc. The address book 152 is typically stored in a server that is accessible to the computer 104, but may be stored in the computer 104 itself.

As mentioned above, the computer applications mentioned herein may be any executable files (typically having file names with a "exe" or "cmd" extension), batch files (typically having file names with a "bat" extension), or any other type of well known executable files. The computer applications also include macro files, which according to the invention are file names having a "fcn" extension. Such macro files are discussed in greater detail below. The macro generator 208 enables the user 108 to generate macro files.

The call processing configurator 210 enables the user 108 to configure and maintain the condition table 202.

The supervisory module 216 enables the user 108 to gain access to the macro generator 208 and the call processing configurator 210.

The outbound call processor 212 processes telephone calls initiated by the computer 104. Such telephone calls are called outbound calls.

The inbound call processor 214 processes telephone calls received by the computer 104. Such telephone calls are called inbound calls.

Figure 15:
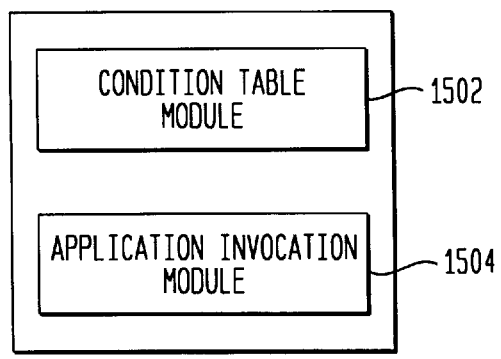
FIG. 15 is a more detailed block diagram of the CAPS.

The outbound call processor 212 and the inbound call processor 214 each include a condition table module 1502 and an application invocation module 1504 as shown in FIG. 15. The condition table module 1502 determines whether a user is configured in the condition table 202. The application invocation module 1504 conditionally invokes computer applications.

These modules of the communication activated processing system 106 are described in greater detail below.

Conditions

As discussed above, the CAPS 106 automatically invokes an appropriate computer application when contact is made with a party identified in the condition table 202, if certain conditions are satisfied, and if the user confirms the invocation. The embodiment of the invention described herein supports the following conditions: UCM (unanswered COD mail), PMF (phone mail full), UHPM (user has phone mail), and CHPM (caller/callee has phone mail). These conditions are described below from the perspective of the user 108 and the computer 104 (i.e., whether these conditions are satisfied at the computer 104).

(The UCM, PMF, UHPM, and CHPM conditions are described herein for illustrative purposes. The invention is not limited to these conditions. Modification of the invention to accommodate additional conditions will be apparent to persons skilled in the relevant art(s) based on the discussion contained herein. Other conditions may be related to, for example, time constraints, geographical conditions, user defined conditions, local/remote system conditions (different types of systems), etc. Conditions may also be defined as complex conjunctive predicates using AND, OR, NOT, etc., logical operators.)

Unanswered COD Mail (UCM)

The UCM condition is satisfied at the computer 104 if: (1) the user 108 sent electronic mail (email) to another user, such as user 122 (called the "email recipient user 122" for reference purposes); (2) this email required a response from the email recipient user 122 (this type of email that requires a response from the email recipient is called COD, confirmation of delivery, email); (3) the email recipient user 122 has not responded to the COD email; and (4) the user 108 initiates contact with the email recipient user 122 (in the case of outbound calls), or the email recipient user 122 initiates contact with the user 108 (in the case of inbound calls). Confirmation of delivery status may take on a variety of forms. The preferred embodiment associates a reply mail item to a particular original mail item. In another embodiment, delivery assumes that the recipient acted upon (read, opened, deleted, etc.) the mail item. Other embodiments may define delivery in various other forms. In any case, COD status is maintained in computer 104.

The UCM condition shall now be further described by way of an example. Suppose that user 108 is preparing the company budget. The user 108 needs information from user 122 in order to complete the company budget. Therefore, the user 108 sends a COD email to the user 122, requesting that the user 122 respond (by email) with the required information.

Also, the user 108 adds row 404 into the condition table 202 (FIG. 4). The user 108 inserts the user 122's telephone number into the phone number predicate field of row 404. The user 108 also stores "budget.bat," representing the file name of the company budget execution batch file, into the application identifier field of the row 404. The user 108 further sets the UCM flag in row 404 to True, thereby activating the UCM condition. If the computer 104 should thereafter receive a call from user 122, then the CAPS 106 will check to see if the user 122 has responded to the COD email. If the user 122 has not responded to the COD email, then the CAPS 106 will invoke the corresponding batch file in computer 104 upon receipt of user confirmation. The user 108 can then modify the company budget as required using information provided by the user 122 during the telephone call between users 108 and 122.

Phone Mail Full (PMF)

The phone mail full condition is satisfied at the computer 104 if: (1) the user 108 attempted to leave a telephone message (i.e., phone mail) with another user, such as user 122, but user 122's phone mail was full; and (2) the user 108 initiates contact with user 122 (in the case of outbound calls), or user 122 initiates contact with the user 108 (in the case of inbound calls).

The PMF condition shall now be further described by way of an example. Consider the above example, where the user 108 is preparing the company budget. The user 108 needs information from user 122 in order to complete the company budget. Instead of sending email to user 122, the user 108 calls user 122. However, user 122 does not answer her telephone, and her phone mail is full.

Given this situation, the user 108 decides to add row 404 into the condition table 202 (FIG. 4), as before. In this case, however, the user 108 sets the PMF flag to True, thereby activating the PMF condition. If the computer 104 should thereafter receive a call from user 122, then the CAPS 106 will check to see if user 122's phone mail is still full. If user 122's phone mail is still full, then it is likely that the user 108 has not subsequently been able to leave a phone mail with user 122. Accordingly, if it is determined that user 122's phone mail is still full, then the CAPS 106 will invoke the corresponding batch file in computer 104 upon receipt of user confirmation. The user 108 can then modify the company budget as required using information provided by the user 122 during the telephone call between users 108 and 122.

User Has Phone Mail (UHPM)

The UHPM condition is satisfied at the computer 104 if: (1) the user 108 has phone mail from another user, such as user 122; and (2) the user 108 calls the user 122 (in the case of outbound calls), or the user 122 calls the user 108 (in the case of inbound calls).

The UHPM condition shall now be further described by way of an example. Suppose that user 108 works with user 122. Every week, user 122 calls user 108 to obtain information regarding the status of an on-going project. User 108 is very busy, so often misses telephone calls. Typically, user 122 leaves a phone mail message with user 108 if user 108 does not answer his phone.

Given this situation, the user 108 decides to add row 406 into the condition table 202 (FIG. 4). The user 108 inserts the user 122's telephone number into the phone number predicate field of row 406. The user 108 also stores "status.fcn," representing the file name of a previously created keystroke macro for automatic navigation to user 108's notes on the status of the on-going project, into the application identifier field of the row 406. The user 108 also sets the UHPM flag to True, thereby activating the UHPM condition. If the user 108 should thereafter call user 122 (for whatever reason), then the CAPS 106 will check to see if the user 108 has phone mail from user 122. If the user 108 has phone mail from user 122, then it is likely that user 122 called user 108 for a status on the on-going project. Thus, if the user 108 has phone mail from user 122, then the CAPS 106 will invoke the corresponding macro in computer 104 upon receipt of user confirmation. The user 108 is then reminded to communicate the status of the on-going project to user 122 during the telephone call between users 108 and 122. The user 108 may intentionally save phone messages in order to accomplish appropriate CAPS 106 processing.

Caller/Callee Has Phone Mail (CHPM)

The CHPM condition is satisfied at the computer 104 if: (1) the user 108 has left phone mail with another user, such as user 122; (2) the user 108 calls the user 122 (in the case of outbound calls), or the user 122 calls the user 108 (in the case of inbound calls); and (3) the user 108's phone mail is in user 122's mail box at the time contact is made between user 108 and user 122.

The CHPM condition shall now be further described by way of an example. Consider the above example, where the user 108 works with user 122. Every week, user 122 calls user 108 to obtain information regarding the status of an on-going project. User 108 is very busy, so often misses telephone calls. Typically, user 122 leaves a phone mail message with user 108 if user 108 does not answer his phone. In this case, assume that user 108 called user 122 with the project status information, but user 122 did not answer the phone. Thus, user 108 left phone mail with user 122, providing the status information in the phone mail message.

Given this situation, the user 108 decides to add row 406 into the condition table 202 (FIG. 4), as before. In this case, however, the user 108 sets the CHPM flag to True, thereby activating the CHPM condition. If the user 108 should thereafter call user 122 (for whatever reason), then the CAPS 106 will check to see if the user 122 has phone mail from user 108. If the user 122 has phone mail from user 108, then it is possible that user 122 has not had a chance to listen to the status information in the user 108's phone mail message. Thus, if the user 122 has phone mail from user 108, then the CAPS 106 will invoke the corresponding macro in computer 104 upon receipt of user confirmation. The user 108 is then reminded to communicate again the status of the on-going project to user 122 during the telephone call between users 108 and 122.

Operation of the Present Invention

Figure 5:
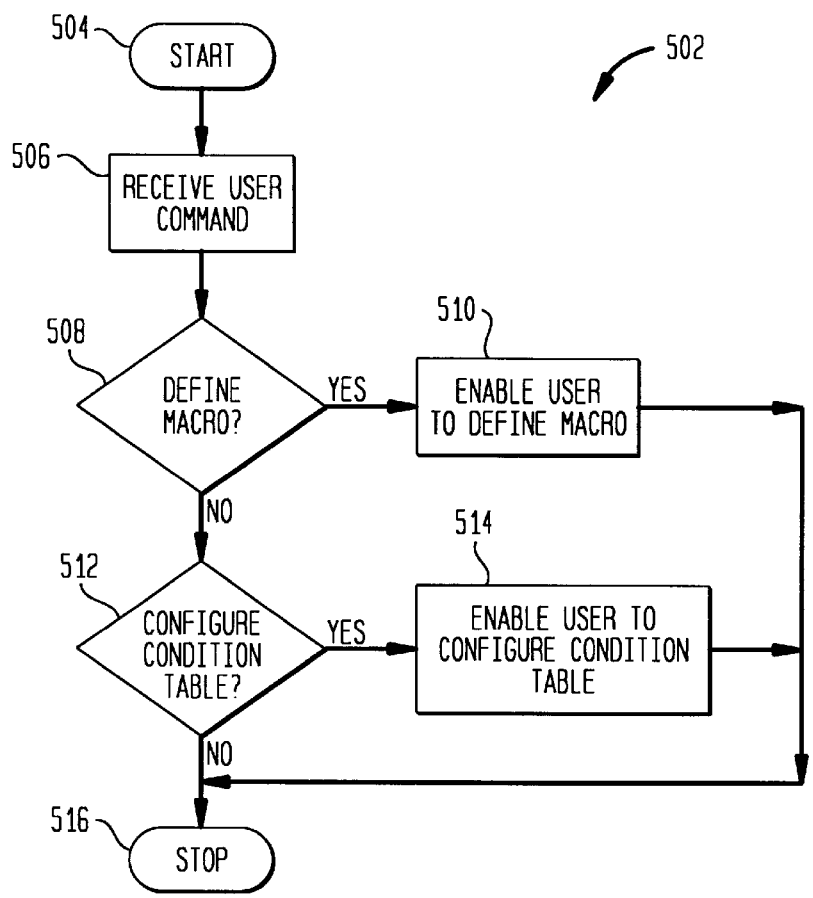

The general operation of the CAPS 106 shall now be described with reference to a flowchart 502 in FIG. 5. Flowchart 502 represents the manner in which the CAPS 106 enables users to generate macros, and enables users to configure the condition table 202. Flowchart 502 begins with step 504, where control immediately passes to step 506.

In step 506, the supervisory module 216 of the CAPS 106 receives a user command entered in any well known manner.

In step 508, the supervisory module 216 determines if the user command is the "define macro" command. If the user command is the "define macro" command, then step 510 is performed. In step 510, the macro generator 208, pursuant to instructions from the supervisory module 216, enables the user to define a macro. Operation of flowchart 502 is then complete, as indicated by step 516.

If the supervisory module 216 determined in step 508 that the user command is not the "define macro" command, then step 512 is performed. In step 512, the supervisory module 216 determines if the user command is the "configure condition table" command. If the user command is the "configure condition table" command, then step 514 is performed. In step 514, the call processing configurator 210, pursuant to instructions from the supervisory module 216, enables the user to configure the condition table 202. Operation of flowchart 502 is then complete, as indicated by step 516.

If the supervisory module 216 in step 512 determined that the user command is not the "configure condition table" command, then the supervisory module 216 ignores the keystroke(s). Operation of flowchart 502 is then complete, as indicated by step 516.

Preferably, the supervisory module 216 is configured as a terminate and stay resident (TSR) process. It becomes a foreground process upon the user's entry of the "define macro" command or the "configure condition table" command. Other implementations of the supervisory module 216 will be apparent to persons skilled in the relevant art(s). For example, in one embodiment, the supervisory module 216 is configured as a background process. It becomes a foreground process upon the user's entry of the "define macro" command or the "configure condition table" command.

Figure 6A:
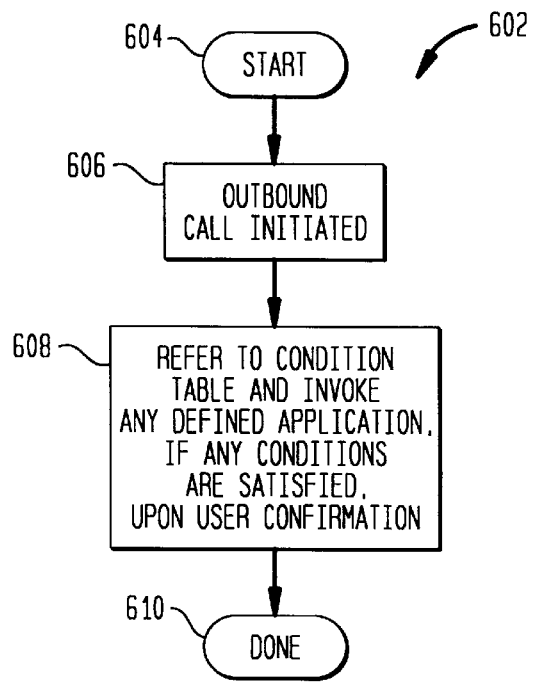

Flowchart 602 in FIG. 6A represents the general operation of the outbound call processor 212. Preferably, the outbound call processor 212, inbound call processor 214, and the supervisory module 216 all execute simultaneously. Flowchart 602 begins with step 604. Control flows to step 606 upon the initiation of an outbound call by the computer 104.

In step 606, the computer 104 initiates an outbound call to a user, such as user 122. This user 122 is called the "callee."

In step 608, the CAPS 106 determines if the callee is represented in the condition table 202 (that is, does the condition table 202 include an outbound row, where the Direction field is set to Outbound or Both, and where the callee is identified in the phone number predicate field). If the callee is represented in the condition table 202, then the CAPS 106 invokes in the computer 104 the computer file/application associated with the callee if the conditions (if any) associated with the callee are satisfied, and if the user confirmation for the invocation is received. Thereafter, the process completes at step 610.

Flowchart 620 in FIG. 6B represents the general operation of the inbound call processor 214. Flowchart 602 begins with step 622. Control flows to step 624 upon the receipt of an inbound call by the computer 104.

In step 624, the computer 104 receives an inbound call from a user, such as user 122. This user 122 is called the "caller."

In step 626, the CAPS 106 determines if the caller is represented in the condition table 202 (that is, does the condition table 202 include an inbound row, where the Direction field is set to Inbound or Both, and where the caller is identified in the phone number predicate field). If the caller is represented in the condition table 202, then the CAPS 106 invokes in the computer 104 the computer file/application associated with the caller if the conditions (if any) associated with the caller are satisfied, and upon receipt of user confirmation. Thereafter, the process completes at step 628.

Macro Generation and Condition Table Maintenance

The operation of the CAPS 106 shall now be described in greater detail with reference to flowcharts 702, 802, 902, and 1002 shown in FIGS. 7–10. Flowcharts 702, 802, 902, and 1002 represent the operation of the CAPS 106 when enabling users to generate macros, and when enabling users to modify the condition table 202. Accordingly, flowcharts 702, 802, 902, and 1002 are more detailed representations of what is shown in flowchart 502 of FIG. 5.

Figure 7:
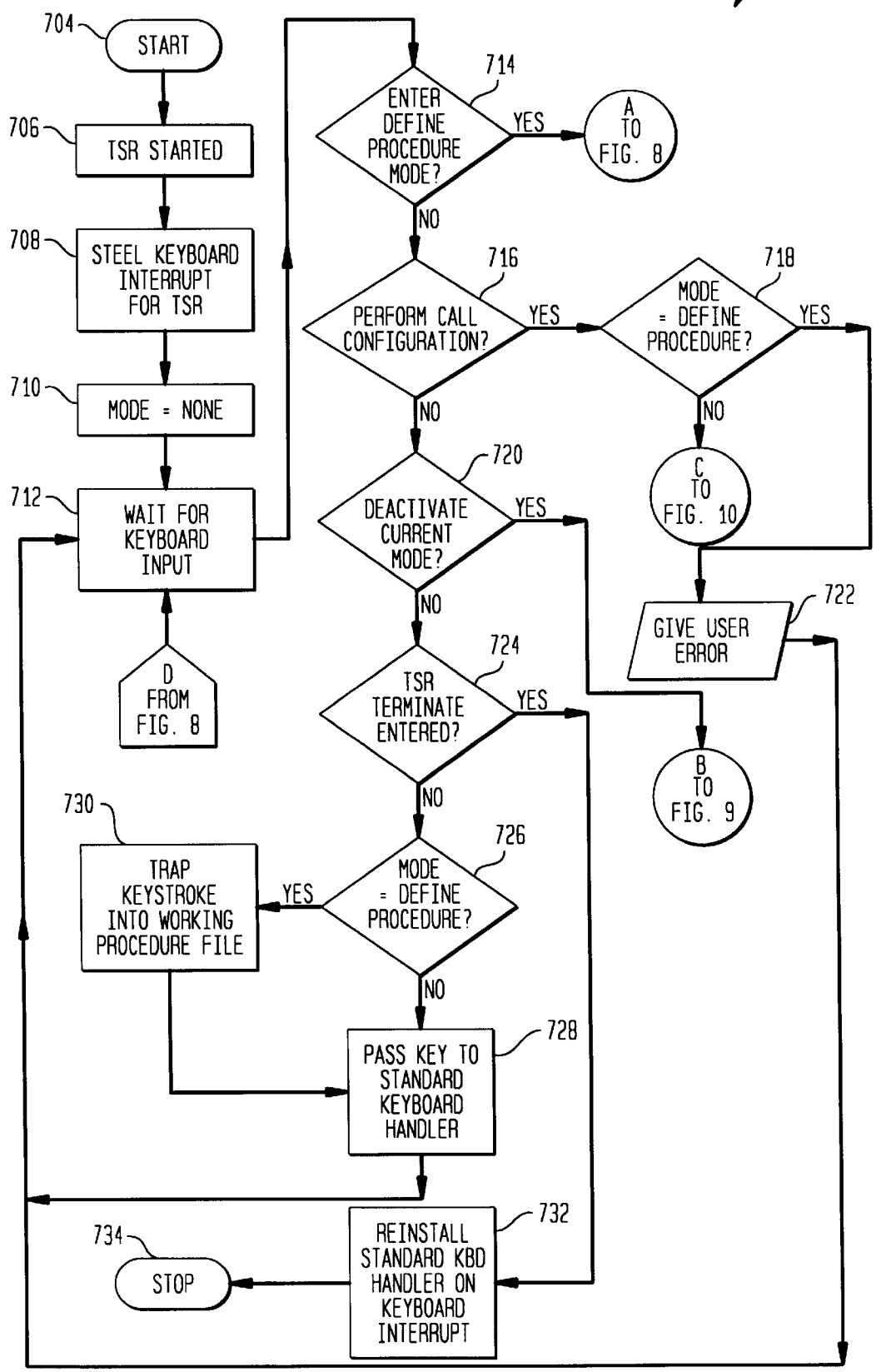

Referring first to flowchart 702 in FIG. 7, the supervisory module 216 starts in step 704. Then, in step 706, the supervisory module 216 is invoked as a terminate and stay resident (TSR) program. As indicated above, other implementations of the supervisory module 216 are within the scope of the present invention. For example, the supervisory module 216 could be a minimized WINDOWS program that is maximized whenever the user 108 wishes to generate a macro or modify the condition table 202. For illustrative purposes, however, the supervisory module 216 is described herein as being a TSR program.

In step 708, the supervisory module 216 modifies in a well known manner the interrupt vector table entry in the computer 104 such that keyboard interrupts are directed to the supervisory module 216, instead of the standard keyboard interrupt handler. By doing this, all keyboard input from the user 108 is directed to the supervisory module 216, instead of the standard keyboard interrupt handler.

In step 710, the supervisory module 216 sets a Mode variable to None. The Mode variable has two possible values: None and Define Procedure. If the Mode variable is equal to None, then a macro (also called a procedure) is not being defined. If the Mode variable is equal to Define Procedure, then a macro is in the process of being defined.

In step 712, the supervisory module 216 waits for keyboard input. In the embodiment being described, where the supervisory module 216 is a TSR program, the supervisory module 216 waits for user input in step 712. The supervisory module 216 becomes active upon the receipt of a keyboard interrupt, and proceeds to step 714.

In step 714, the supervisory module 216 determines whether the received keyboard input represents the Define Macro (or Procedure) command. This command is preferably indicated by a series of keystrokes, such as ALT-SHIFT-D. If the received keyboard input does not represent the Define Macro command, then step 716 is performed (described below). Otherwise, control flows to step 804 in FIG. 8.

Figure 8:
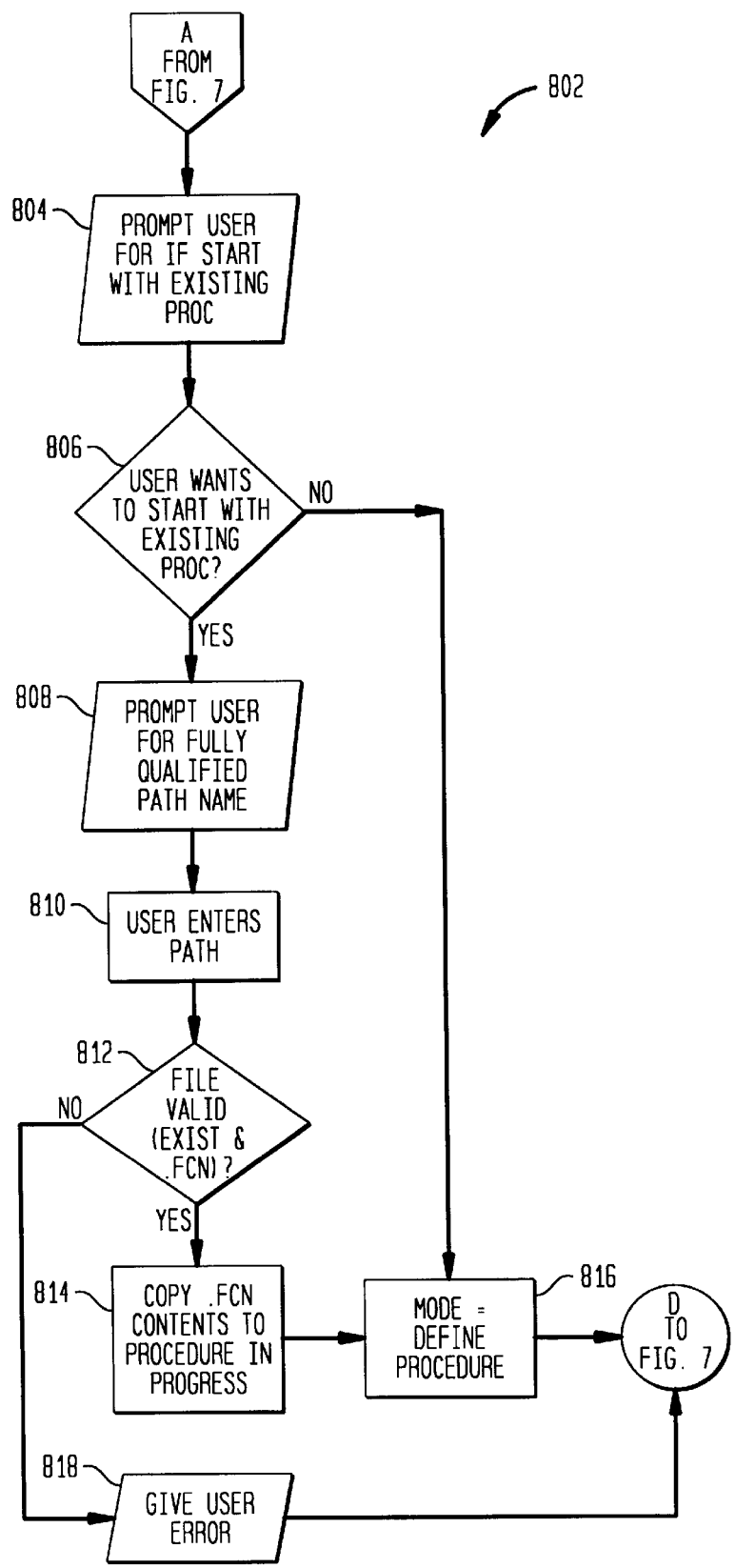

Referring now to FIG. 8, in step 804 the macro generator 208 asks the user 108 whether he wishes to start with an existing macro. Thus, previously defined macros can be used to build new macros. If the user 108 does not wish to start with an existing macro, as determined in step 806, then step 816 is performed (described below). If the user 108 wishes to start with an existing macro, then step 808 is performed.

In step 808, the macro generator 208 prompts the user for a fully qualified path name.

In step 810, the user 108 enters a path name. The macro generator 208 receives this path name.

In step 812, the macro generator 208 determines whether the path name identifies a valid file. The path name identifies a valid file if a file exists, and if the file is a macro file (i.e., a file with a FCN extension). If the path name does not identify a valid file, then in step 818 the macro generator 208 displays an error message to the user 108. Control then flows to step 712 in FIG. 7 (step 712 was described above).

If the path name identifies a valid file, then step 814 is performed. In step 814, the macro generator 208 copies the contents of the file identified by the path name into a buffer. The contents of this buffer represent the macro currently being defined (called the macro or procedure in progress). For reference purposes, this buffer is called the macro definition buffer.

Execution of step 814 always copies the macro to the end of (concatenates) what is currently in the macro definition buffer. An alternative embodiment peinits the user to specify where in the buffer to copy the macro information and how (insert, overwrite, etc.).

In step 816, the macro generator 208 sets the Mode variable to Define Procedure, indicating that a macro is in the process of being defined. Control then flows to step 712 in FIG. 7 (step 712 was described above).

Referring again to FIG. 7, if the supervisory module 216 determined in step 714 that the received keyboard input did not represent the Define Macro (or Procedure) command, then step 716 is performed. In step 716, the supervisory module 216 determines whether the received keyboard input represents the "configure condition table" command. This command is preferably indicated by a series of keystrokes, such as ALT-SHIFT-C. If the received keyboard input does not represent the "configure condition table" command, then step 720 is performed (described below). Otherwise, step 718 is performed.

In step 718, the supervisory module 216 determines whether the Mode variable is equal to Define Procedure. If the Mode variable is equal to Define Procedure, indicating that a macro is in the process of being formed, then the supervisory module 216 displays an error message at step 722 to the user 108. This error message informs the user 108 that he should not attempt to modify the condition table 202 while a macro is being formed. Control then flows to step 712 (described above).

Figure 10:
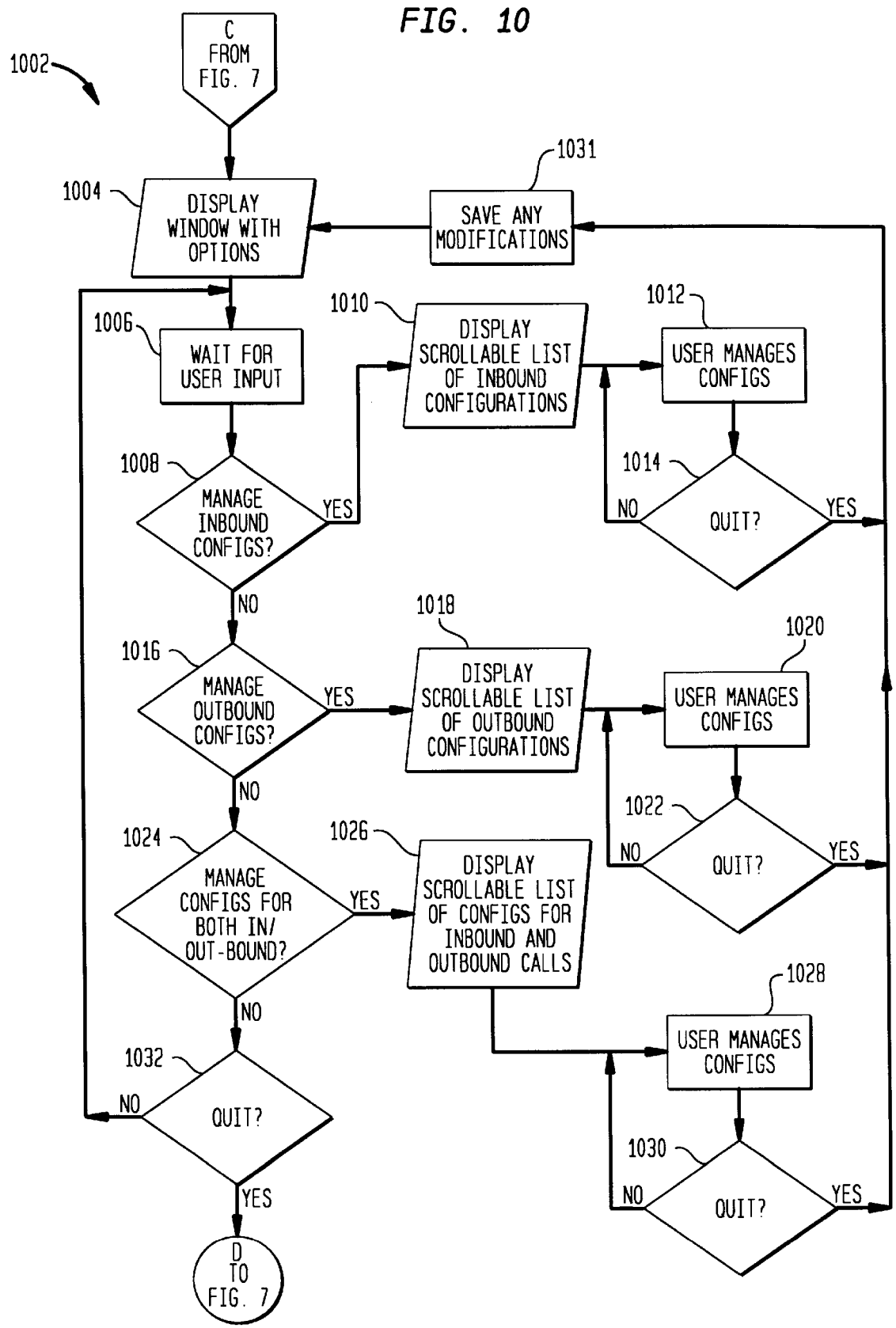

If the supervisory module 216 determines in step 718 that the Mode variable is not equal to Define Procedure, then step 1004 in FIG. 10 is performed.

Referring now to FIG. 10, in step 1004 the call processing configurator 210 presents the user 108 with a menu of options. The options are: (1) modify inbound configurations of condition table 202; (2) modify outbound configurations of condition table 202; (3) modify the inbound/outbound configurations of the condition table 202; and (4) quit.

In step 1006, the call processing configurator 210 waits for and receives user input.

In step 1008, the call processing configurator 210 analyzes the user input to determine whether the user 108 wishes to modify the inbound configurations. If the user 108 does not wish to modify the inbound configurations, then step 1016 is performed (described below). Otherwise, step 1010 is performed.

In step 1010, the call processing configurator 210 displays the inbound configurations of condition table 202 in a scrollable list. The configuration table 202 is preferably a database table. The call processing configurator 210 in step 1010 may invoke a database application (such as PARADOX) associated with the configuration table 202. The database application enables the user 108 to view and modify the inbound configurations in a well known manner.

In step 1012, the user 108 modifies the inbound configurations. The user 108 may insert new entries, delete existing entries, modify existing entries, or make no modifications to the inbound configurations of condition table 202. Control flows to step 1031 after the user 108 completes his modifications of the inbound configurations (as determined in step 1014). In step 1031, the call processing configurator 210 saves all of the user 108's modifications in the condition table 202. Control then returns to step 1004 (described above).

If the call processing configurator 210 in step 1008 determines that the user 108 does not wish to modify the inbound configurations of condition table 202, then step 1016 is performed. In step 1016, the call processing configurator 210 analyzes the user input (received in step 1006) to determine whether the user 108 wishes to modify the outbound configurations of condition table 202. If the user 108 does not wish to modify the outbound configurations, then step 1024 is performed (described below). Otherwise, step 1018 is performed.

In step 1018, the call processing configurator 210 displays the outbound configurations in a scrollable list.

In step 1020, the user 108 modifies the outbound configurations of the condition table 202. The user 108 may insert new entries, delete existing entries, modify existing entries, or make no modifications to the outbound configurations. Control flows to step 1031 after the user 108 completes his modifications of the outbound configurations (as determined in step 1022). In step 1031, the call processing configurator 210 saves all of the user 108's modifications in the condition table 202. Control then returns to step 1004 (described above).

If the call processing configurator 210 in step 1016 determines that the user 108 does not wish to modify the outbound configurations in the condition table 202, then step 1024 is performed. In step 1024, the call processing configurator 210 analyzes the user input (received in step 1006)

to determine whether the user 108 wishes to modify the configurations for both inbound and outbound processing. If the user 108 does not wish to modify the configurations for both inbound and outbound processing, then step 1032 is performed (described below). Otherwise, step 1026 is performed.

In step 1026, the call processing configurator 210 displays the configurations for both inbound and outbound processing in a scrollable list.

In step 1028, the user 108 modifies the configurations for both inbound and outbound processing. The user 108 may insert new entries, delete existing entries, modify existing entries, or make no modifications to such inbound/outbound configurations. Control flows to step 1031 after the user 108 completes his modifications (as determined in step 1030). In step 1031, the call processing configurator 210 saves all of the user 108's modifications, if any, in the condition table 202. Control then returns to step 1004 (described above).

If the call processing configurator 210 in step 1024 determines that the user 108 does not wish to modify the inbound/outbound configurations, then step 1032 is performed. In step 1032, the call processing configurator 210 analyzes the user input (received in step 1006) to determine whether the user 108 wishes to quit. If the user 108 does not wish to quit, then control returns to step 1006 (described above). Otherwise, control flows to step 712 in FIG. 7 (described above).

Referring again to FIG. 7, if the supervisory module 216 determined in step 716 that the received keyboard input did not represent the "configure condition table" command, then step 720 is performed. In step 720, the supervisory module 216 determines whether the received keyboard input (from step 712) represents the "deactivate current mode" command. This command is preferably indicated by a series of keystrokes, such as ALT-SHIFT-O. If the received keyboard input does not represent the "deactivate current mode" command, then step 724 is performed (described below). Otherwise, step 904 in FIG. 9 is performed.

Figure 9:
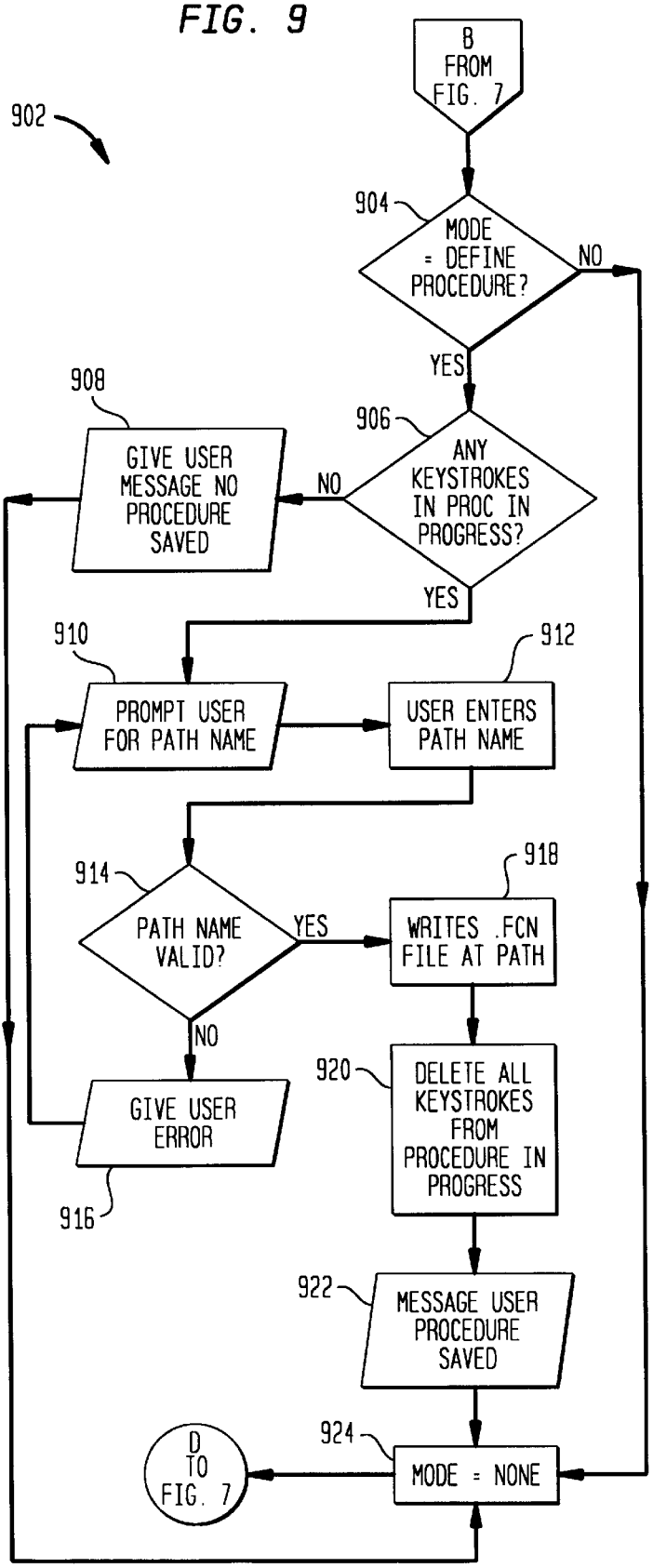

Referring now to FIG. 9, in step 904 the macro generator 208 determines whether the Mode variable is equal to Define Procedure. If the Mode variable is not equal to Define Procedure, then in step 924 the macro generator 208 sets the Mode variable to None again (a common code path). Control then flows to step 712 in FIG. 7 (described above). If, instead, the Mode variable is equal to Define Procedure, then step 906 is performed.

In step 906, the macro generator 208 determines whether the macro definition buffer (refer to step 814 and step 730) is empty. If the macro definition buffer is empty, then the user 108 has not entered any keystrokes for the current macro being generated. Accordingly, in step 908, the macro generator 208 displays a message to the user 108, informing the user 108 that there is no macro to save. The macro generator 208 then sets the Mode variable to None in step 924, and then performs step 712 in FIG. 7 (described above).

If the macro generator 208 in step 906 determines that the macro definition buffer is not empty, then step 910 is performed. In step 910, the macro generator 208 prompts the user 108 for a file name and a path name.

In step 912, the user 108 enters a file name and a path name.

In step 914, the macro generator 208 determines whether the path name and the file name are valid. For example, the path name may specify a directory that does not exist. In one embodiment, the FCN extension is automatically applied if not provided. If the file name and path name are not valid, then in step 916 the macro generator 208 displays an error message. Control then returns to step 910. If the file name and path name are valid, then step 918 is performed.

In step 918, the macro generator 208 creates a new file in accordance with the file name and path name entered in step 912, and stores the contents of the macro definition buffer in the new file.

In step 920, the macro generator 208 clears the macro definition buffer.

In step 922, the macro generator 208 informs the user 108 that the macro has been saved.

In step 924, the macro generator 208 sets the Mode variable to None. Control then flows to step 712 in FIG. 7.

Referring again to FIG. 7, if the supervisory module 216 determined in step 720 that the received keyboard input (from step 712) did not represent the "deactivate current mode" command, then step 724 is performed. In step 724, the supervisory module 216 determines whether the received keyboard input represents the "terminate TSR" command. This command is preferably indicated by a series of keystrokes, such as ALT-SHIFT-T. If the received keyboard input does not represent the "terminate TSR" command, then step 726 is performed (described below). Otherwise, the supervisory module 216 in step 732 reinstalls the standard keyboard handler so that the standard keyboard handler receives keyboard interrupts. Operation of flowchart 702 is then complete, as indicated by step 734.

In step 726 (which is performed if the supervisory module 216 determined in step 724 that the received keyboard input does not represent the "terminate TSR" command), the supervisory module 216 determines whether the Mode variable is equal to Define Procedure. If the Mode variable is equal to Define Procedure, then the supervisory module 216 in step 730 stores the received keyboard input (from step 712) into the macro definition buffer. This received keyboard input represents a portion of the macro being defined. Control then continues to step 728 (described below).

If it is determined in step 726 that the Mode variable is not equal to Define Procedure, then the supervisory module 216 in step 728 passes the received keyboard input to the standard keyboard handler. Control then returns to step 712.

Thus, macros are built at the same time keyboard input is transmitted to computer 104. It is the user's responsibility to be in a context appropriate for recording the macro.

Inbound Call Processing

Figure 11:
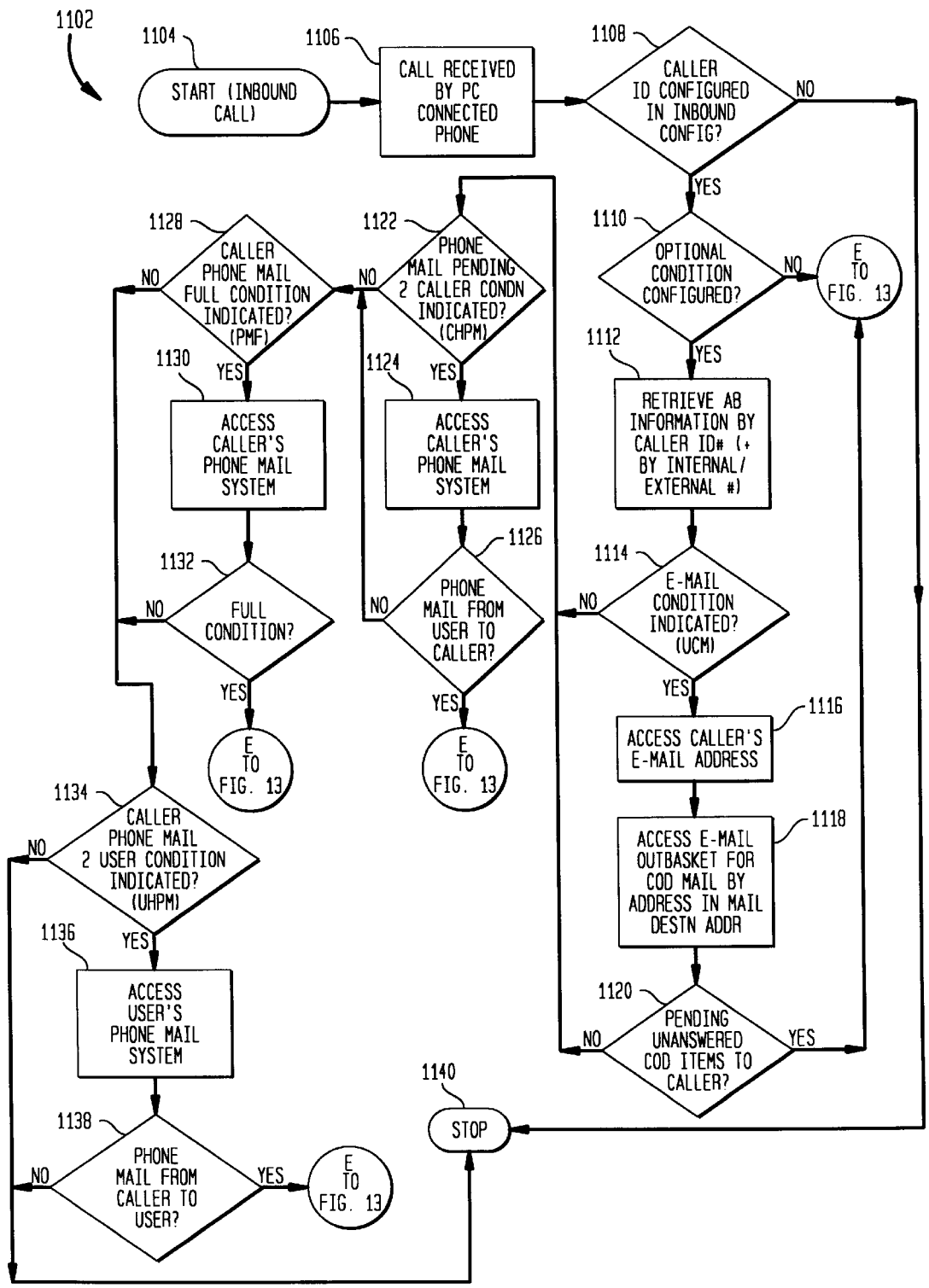

Flowchart 1102 in FIG. 11 represents the operation of the inbound call processor 214 when processing a call received by the computer 104. Flowchart 1102 begins with step 1104, where control immediately passes to step 1106.

In step 1106, the computer 104 receives an inbound call from a caller, such as user 122. The computer 104 determines in a well known manner the telephone number (using ANI technology) of the caller.

In step 1108, the inbound call processor 214 determines whether the caller is represented in the condition table 202 (in other words, the inbound call processor 214 determines whether the caller is configured in the condition table 202). That is, the inbound call processor 214 determines whether the condition table 202 includes an inbound entry (where Direction is set to Inbound or Both) where information in the phone number predicate field matches the caller's telephone number. This entry, if one exists, is called the matching inbound entry for reference purposes. If the caller is configured in the condition table 202, then step 1110 is performed (described below). Otherwise, processing of flowchart 1102 is complete, as indicated by step 1140.

In step 1110, the inbound call processor 214 determines whether any of the conditions (UCM, PMF, UHPM, CHPM)

are active for the caller. The inbound call processor 214 performs step 1110 by determining whether any of the condition flags in the matching inbound entry are set to True, indicating that the associated condition is active. If none of the condition flags are set to True, then there are no active conditions associated with the caller. In this case, control flows to step 1304 in FIG. 13.

Figure 13:
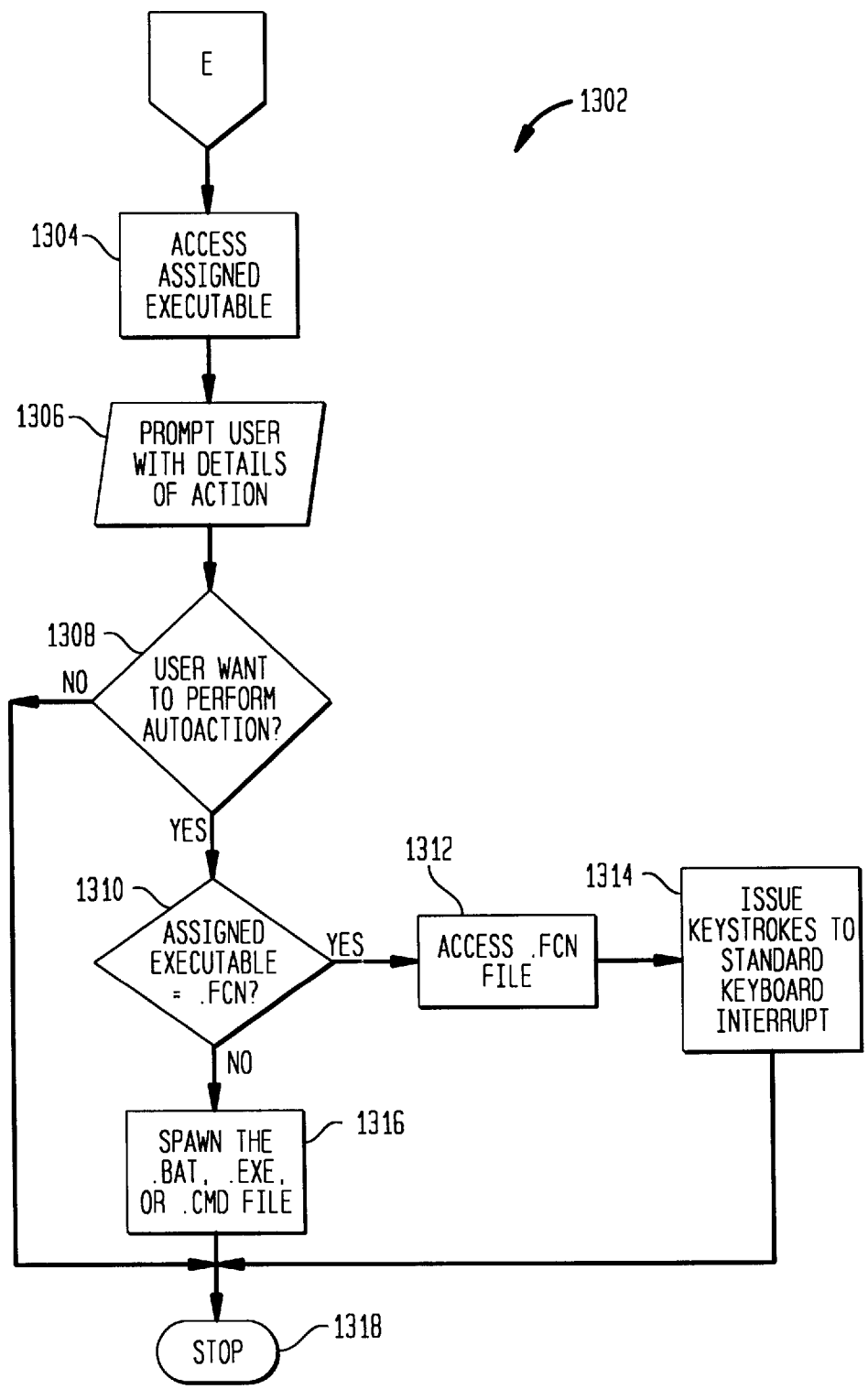

Referring now to FIG. 13, in step 1304 the inbound call processor 214 retrieves the name of the application (i.e., executable) from the application identifier field of the matching inbound entry.

In step 1306, the inbound-call processor 214 asks the user 108 whether he wishes to load the application (identified by the information retrieved in step 1304). The user 108 may not wish to load the application if the application is already running in the computer 104, or the user may not think it is necessary at this time to automatically execute the application. If the user 108 does not wish to execute the application in the computer 104, then flowcharts 1102 and 1302 are complete, as indicated by step 1318. Otherwise, step 1310 is performed.

In step 1310, the inbound call processor 214 determines whether the application is a macro (by determining whether the information in the application identifier field identifies a file with a FCN extension). If the application is not a macro, then the inbound call processor 214 in step 1316 invokes the application in a well known manner. Flowcharts 1102 and 1302 are then complete, as indicated by step 1318.

If the inbound call processor 214 determined in step 1310 that the application is a macro, then step 1312 is performed. In step 1312, the inbound call processor 214 retrieves the contents of the FCN file identified by the information contained in the application identifier field of the matching inbound entry. In step 1314, the inbound call processor 214 issues the keyboard keystrokes represented by the information retrieved in step 1312 to the standard keyboard handler. Flowcharts 1102 and 1302 are then complete, as indicated by step 1318.

An alternative embodiment of step 1306 would be to also determine if the application is already active. The user would then have three options: the user 108 could (1) reject automatic invocation, (2) accept automatic invocation, or (3) accept auto-focus of the window for the already active application.

Referring again to FIG. 11, if the inbound call processor 214 determined in step 1110 that one or more conditions were active for the caller, then step 1112 is performed. In step 1112, the inbound call processor 214 retrieves information pertaining to the caller from the address book 152. This information includes the caller's email address and phone mail address, and step 1112 preferably just retrieves the entire available information. This information is typically available only if the caller is on the same network as the user 108. However, the invention includes embodiments when this information is available in the address book for any parties who may communicate with the user 108 (for example, the user 108 may manually enter this information into a locally maintained address book 152).

In step 1114, the inbound call processor 214 determines whether the UCM condition is active by reference to the UCM flag in the matching inbound entry. If the UCM condition is not active, then step 1122 is performed (described below). Otherwise, step 1116 is performed.

In step 1116, the inbound call processor 214 accesses the caller's email address which was retrieved from the address book 152. (This was done in step 1112.)

In step 1118, the inbound call processor 214 uses the caller's email address to access the user 108's email in and out baskets. The call processor 214 searches the user 108's email in and out baskets to determine whether the user 108 has any unanswered COD email to the caller. If the user 108 has unanswered COD email to the caller, then the call processor 214 determines whether the caller has responded to all of the COD email from the user 108.

In step 1120, the inbound call processor 214 determines whether the user 108 has any unanswered COD email to the caller. The user 108 has unanswered COD email to the caller as determined by a well known status email item in reply to the user 108's original email. If the user 108 has any unanswered COD email to the caller, then the UCM condition is satisfied. Thus, the steps of flowchart 1302 in FIG. 13 are performed (discussed above). Otherwise, step 1122 is performed.

In step 1122, the inbound call processor 214 determines whether the CHPM condition is active for the caller by reference to the CHPM flag in the matching inbound entry. If the CHPM condition is not active, then step 1128 is performed (discussed below). Otherwise, step 1124 is performed.

In step 1124, the inbound call processor 214 accesses the caller's phone mail using well known communication techniques associated with the private branch exchange (PBX) 154.

In step 1126, the inbound call processor 214 determines whether the caller has any phone mail from the user 108. If the caller has phone mail from the user 108, then the CHPM condition is satisfied. Thus, the steps of flowchart 1302 in FIG. 13 are performed (discussed above). Otherwise, step 1128 is performed.

In step 1128, the inbound call processor 214 determines whether the PMF condition is active for the caller by reference to the PMF flag in the matching inbound entry. If the PMF condition is not active, then step 1134 is performed (discussed below). Otherwise, step 1130 is performed.

In step 1130, the inbound call processor 214 accesses the caller's phone mail, again using well known PBX communication techniques.

In step 1132, the inbound call processor 214 determines whether the caller's phone mail system is full. If the caller's phone mail system is full, then the PMF condition is satisfied. Thus, the steps of flowchart 1302 in FIG. 13 are performed (discussed above). Otherwise, step 1134 is performed.

In step 1134, the inbound call processor 214 determines whether the UHPM condition is active for the caller by reference to the UHPM flag in the matching inbound entry. If the UHPM condition is not active, then none of the active conditions are satisfied. Flowchart 1102 is then complete, as indicated by step 1140. Otherwise, step 1136 is performed.

In step 1136, the inbound call processor 214 accesses the user 108's phone mail system, again using well known PBX communication techniques.

In step 1138, the inbound call processor 214 determines whether the user 108's phone mail system includes any phone mail messages from the caller to the user 108. If the user 108's phone mail system includes one or more phone mail messages from the caller to the user 108, then the UHPM condition is satisfied. Thus, the steps of flowchart 1302 in FIG. 13 are performed (discussed above). Otherwise, none of the active conditions for the caller are satisfied, and flowchart 1102 is complete (as indicated by step 1140).

Outbound Call Processing

Figure 12:
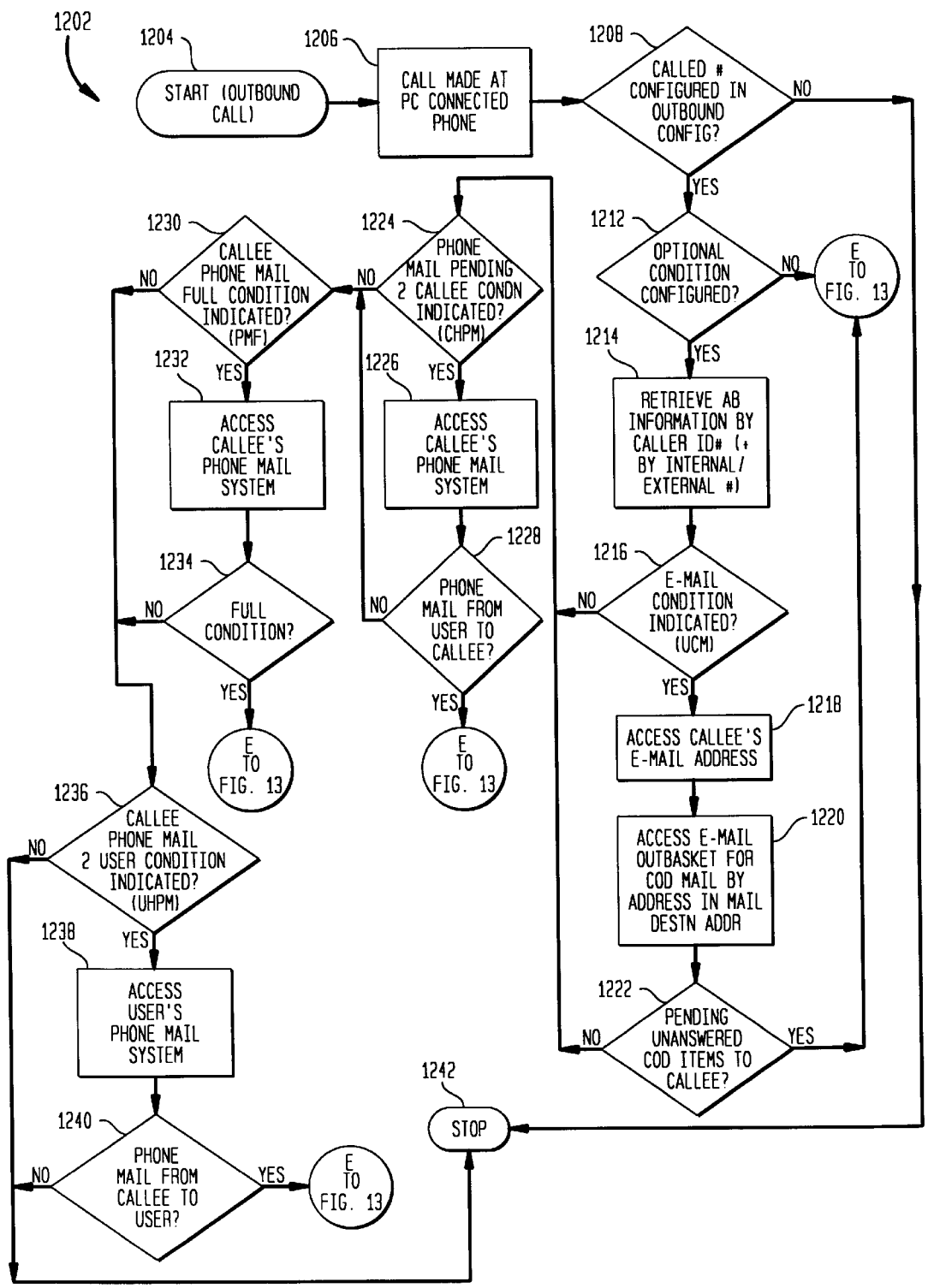

Flowchart 1202 in FIG. 12 represents the operation of the outbound call processor 212 when processing an outbound call initiated by the computer 104. Flowchart 1202 begins with step 1204, where control immediately passes to step 1206.

In step 1206, the computer 104 initiates an outbound call to a callee, such as user 122.

In step 1208, the outbound call processor 212 determines whether the callee is represented in the condition table 202 (in other words, the outbound call processor 212 determines whether the callee is configured in the condition table 202). That is, the outbound call processor 212 determines whether the condition table 202 includes an outbound entry (where the Direction field is equal to Outbound or Both) where information in the phone number predicate field matches the callee's telephone number. This entry, if one exists, is called the matching outbound entry for reference purposes. If the callee is configured in the condition table 202, then step 1212 is performed (described below). Otherwise, processing of flowchart 1202 is complete, as indicated by step 1242.

In step 1212, the outbound call processor 212 determines whether any of the conditions (UCM, PMF, UHPM, CHPM) are active for the callee. The outbound call processor 212 performs step 1212 by determining whether any of the condition flags in the matching outbound entry are set to True, indicating that the associated condition is active. If none of the condition flags are set to True, then there are no active conditions associated with the callee. In this case, control flows to flowchart 1302 in FIG. 13 (described above).

If the outbound call processor 212 determines in step 1212 that one or more conditions were active for the callee, then step 1214 is performed. In step 1214, the outbound call processor 212 retrieves information pertaining to the callee from the address book 152. This information includes the callee's email address and phone mail address.

In step 1216, the outbound call processor 212 determines whether the UCM condition is active by reference to the UCM flag in the matching outbound entry. If the UCM condition is not active, then step 1224 is performed (described below). Otherwise, step 1218 is performed.

In step 1218, the outbound call processor 212 accesses the callee's email address which was retrieved from the address book 152. (This was done in step 1214.)

In step 1220, the outbound call processor 212 uses the callee's email address to access the user 108's email in and out baskets. The call processor 212 searches the user 108's email in and out baskets to determine whether the user 108 has any unanswered COD email to the callee. If the user 108 has any unanswered COD email to the callee, then the call processor 212 determines whether the callee has responded to all of the COD email from the user 108.

In step 1222, the outbound call processor 212 determines whether the user 108 has any unanswered COD email to the callee. The user 108 has unanswered COD email to the callee as determined by a well known status email item in reply to the user 108's original email. If the user 108 has any unanswered COD email to the callee, then the UCM condition is satisfied. Thus, the steps of flowchart 1302 in FIG. 13 are performed (discussed above). Otherwise, step 1224 is performed.

In step 1224, the outbound call processor 212 determines whether the CHPM condition is active for the callee by reference to the CHPM flag in the matching outbound entry. If the CHPM condition is not active, then step 1230 is performed (discussed below). Otherwise, step 1226 is performed.

In step 1226, the outbound call processor 212 accesses the callee's phone mail using well known PBX communication techniques.

In step 1228, the outbound call processor 212 determines whether the callee has any phone mail from the user 108. If the callee has phone mail from the user 108, then the CHPM condition is satisfied. Thus, the steps of flowchart 1302 in FIG. 13 are performed (discussed above). Otherwise, step 1230 is performed.

In step 1230, the outbound call processor 212 determines whether the PMF condition is active for the callee by reference to the PMF flag in the matching outbound entry. If the PMF condition is not active, then step 1236 is performed (discussed below). Otherwise, step 1232 is performed.

In step 1232, the outbound call processor 212 accesses the callee's phone mail using well known PBX communication techniques.

In step 1234, the outbound call processor 212 determines whether the callee's phone mail system is full. If the callee's phone mail system is full, then the PMF condition is satisfied. Thus, the steps of flowchart 1302 in FIG. 13 are performed (discussed above). Otherwise, step 1236 is performed.

In step 1236, the outbound call processor 212 determines whether the UHPM condition is active for the callee by reference to the UHPM flag in the matching outbound entry. If the UHPM condition is not active, then none of the active conditions are satisfied. Flowchart 1202 is then complete, as indicated by step 1242. Otherwise, step 1238 is performed.

In step 1238, the outbound call processor 212 accesses the user 108's phone mail system using well known PBX communication techniques.

In step 1240, the outbound call processor 212 determines whether the user 108's phone mail system includes any phone mail messages from the callee to the user 108. If the user 108's phone mail system includes one or more phone mail messages from the callee to the user 108, then the UHPM condition is satisfied. Thus, the steps of flowchart 1302 in FIG. 13 are performed (discussed above). Otherwise, none of the active conditions for the callee are satisfied, and flowchart 1202 is complete (as indicated by step 1242).

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of communication activated processing, comprising the steps of:
   (1) establishing a connection between a first user at a computer and a second user;
   (2) determining whether said second user is configured in a condition table; and
   (3) if said second user is configured in said condition table, then invoking in said computer an application associated with said second user subject to at least any active conditions associated with said second user, said at least any active conditions associated with said second user comprising one or more of:
      (i) an unanswered COD mail condition;
      (ii) a phone mail full condition;
      (iii) a user has phone mail condition; and
      (iv) a caller/callee has phone mail condition.

2. The method of claim 1, wherein step (3) comprises the step of:
   invoking in said computer said application associated with said second user upon receipt of invocation confirmation from said first user.

3. The method of claim 1, further comprising the step of:

(4) enabling said first user to modify said condition table.

4. The method of claim 3, wherein step (4) comprises the steps of:

enabling said first user to create a new entry in said condition table;

enabling said first user to store in said new entry an indication of whether the new entry is an inbound configuration, an outbound configuration, or an inbound/outbound configuration;

enabling said first user to store in said new entry information identifying a party;

enabling said first user to store in said new entry information identifying an application to be associated with said party; and enabling said first user to store in said new entry information to activate one or more conditions to be associated with said party.

5. The method of claim 1, wherein step (1) comprises the step of receiving at said computer an inbound telephone call initiated by said second user.

6. The method of claim 1, wherein step (1) comprises the step of initiating an outbound telephone call from said computer to said second user.

7. The method of claim 1, wherein step (1) comprises the step of connecting said first user to said second user via a computer network.

8. The method of claim 1, wherein said application corresponds to one of a compiled and linked file, a batch file, and a macro file.

9. The method of claim 8, wherein definition of said macro file includes one or more previously defined macro files.

10. The method of claim 1, wherein step (3)(i) comprises the steps of:

(a) determining if said unanswered COD mail condition is active;

(b) if said unanswered COD mail condition is active, then determining whether said first user has unanswered COD mail sent to said second user; and (c) if said first user has unanswered COD mail sent to said second user, then conditionally invoking in said computer said application associated with said second user.

11. The method of claim 1, wherein step (3)(ii) comprises the steps of:

(a) determining if said phone mail full condition is active;

(b) if said phone mail full condition is active, then determining whether phone mail of said second user is full; and (c) if phone mail of said second user is full, then conditionally invoking in said computer said application associated with said second user.

12. The method of claim 1, wherein step (3)(iii) comprises the steps of:

(a) determining if said user has phone mail condition is active;

(b) if said first user has phone mail condition is active, then determining whether said first user has phone mail sent from said second user; and (c) if said first user has phone mail sent from said second user, then conditionally invoking in said computer said application associated with said second user.

13. The method of claim 1, wherein step (3)(iv) comprises the steps of:

(a) determining if said caller/callee has phone mail condition is active;

(b) if said caller/callee has phone mail condition is active, then determining whether said second user has phone mail sent from said first user; and (c) if said second user has phone mail sent from said first user, then conditionally invoking in said computer said application associated with said second user.

14. The method of claim 1, wherein step (3) comprises the steps of:

enabling said first user to enter an automatic invocation confirmation command; and invoking in said computer said application associated with said second user if said first user enters said automatic invocation confirmation command.

15. A method of communication activated processing, comprising the steps of:

(1) establishing a connection between a first user at a computer and a second user;

(2) determining whether said second user is configured in a condition table;

(3) if said second user is configured in said condition table, then determining whether any active conditions associated with said second user are satisfied, said any active conditions associated with said second user comprising one or more of:

(i) an unanswered COD mail condition;

(ii) a phone mail full condition;

(iii) a user has phone mail condition; and (iv) a caller/callee has phone mail condition;

(4) if said any active conditions associated with said second user are satisfied, then determining whether an application associated with said second user is active in said computer;

(5) if said application associated with said second user is active in said computer, then enabling said first user to enter a command to: (a) confirm automatic invocation of a new instance of said application; (b) reject automatic invocation of a new instance of said application; or (c) automatically focus said active application; and (6) processing said first user's command.

16. A computer, comprising:

a storage device;

a condition table stored in said storage device;

a communication device to establish a connection between a first user at said computer and a second user;

a condition table module to determine whether said second user is configured in said condition table; and an application invocation module to invoke, if said second user is configured in said condition table, in said computer an application associated with said second user subject to at least any active conditions associated with said second user, said at least any active conditions associated with said second user comprising one or more of:

(i) an unanswered COD mail condition;

(ii) a phone mail full condition;

(iii) a user has phone mail condition; and (iv) a caller/callee has phone mail condition.

17. The computer of claim 16, wherein said application invocation module comprises:

means for invoking in said computer said application associated with said second user upon receipt of invocation confirmation from said first user.

18. The computer of claim 16, wherein said communication device receives at said computer an inbound telephone call initiated by said second user, initiates an outbound telephone call from said computer to said second user, or connects said first user to said second user via a computer network.

19. The computer of claim 18, wherein said application corresponds to one of a compiled and linked file, a batch file, and a macro file, and wherein definition of said macro file includes zero or more previously defined macro files.

20. The computer of claim 16, wherein said application invocation module comprises:

means for enabling said first user to enter an automatic invocation confirmation command; and means for invoking in said computer said application associated with said second user if said first user enters said automatic invocation confirmation command.

21. A computer program product comprising a computer useable medium having computer program logic recorded thereon for enabling a processor in a computer to conditionally invoke applications in the computer, said computer program logic comprising:

connection establishing means for enabling the processor to establish a connection between a first user at the computer and a second user;

determining means for enabling the processor to determine whether said second user is configured in a condition table; and invocation means for enabling the processor to, if said second user is configured in said condition table, invoke in said computer an application associated with said second user subject to at least any active conditions associated with said second user, said at least any active conditions associated with said second user comprising one or more of:

(i) an unanswered COD mail condition;
(ii) a phone mail full condition;
(iii) a user has phone mail condition; and
(iv) a caller/callee has phone mail condition.

22. The computer program product of claim 21, wherein said invocation means comprises:

means for enabling the processor to invoke in said computer said application associated with said second user upon receipt of invocation confirmation from said first user.

23. The computer program product of claim 21, wherein said connection establishing means comprises:

means for enabling the processor to receive at said computer an inbound telephone call initiated by said second user, initiate an outbound telephone call from said computer to said second user, or connect said first user to said second user via a computer network.

24. The computer program product of claim 21, wherein said application corresponds to one of a compiled and linked file, a batch file, and a macro file, and wherein definition of said macro file includes zero or more previously defined macro files.

25. The computer program product of claim 21, wherein said invocation means comprises:

means for enabling the processor to enable said first user to enter an automatic invocation confirmation command; and means for enabling the processor to invoke in said computer said application associated with said second user if said first user enters said automatic invocation confirmation command.

* * * * *